United States Patent [19]

Chalmers

[11] 4,327,928
[45] May 4, 1982

[54] MOTORCYCLE FORK STRUCTURE

[76] Inventor: William P. Chalmers, 571-½ 67th St., Inglewood, Calif. 90302

[21] Appl. No.: 141,787

[22] Filed: Apr. 21, 1980

[51] Int. Cl.³ .................................................. B62K 25/08
[52] U.S. Cl. .................................................. 280/277
[58] Field of Search ............... 280/274, 275, 276, 277, 280/283; 188/321; 267/8 R, 66, 68

[56] References Cited

U.S. PATENT DOCUMENTS

| 836,040 | 11/1906 | Hornecker et al. | 280/276 |
| 1,715,246 | 5/1929 | Osborn | 280/277 |

FOREIGN PATENT DOCUMENTS

| 1102954 | 10/1955 | France | 280/277 |
| 533 | of 1881 | United Kingdom | 280/277 |
| 606617 | 8/1948 | United Kingdom | 280/277 |

Primary Examiner—Joseph F. Peters, Jr.
Assistant Examiner—Randall A. Schrecengost
Attorney, Agent, or Firm—Edward A. Sokolski

[57] ABSTRACT

A fork structure for a motorcycle in which the steering column is connected to the wheel axle so that while it is free to move longitudinally on shock mounts, it is constrained against any significant rotatable motion relative to the axle, thereby minimizing bushing wear and providing tighter response in the steering control. The front end forks of a motorcycle are formed by a pair of tubular members which are rigidly attached to the steering column. These tubular members have slots formed near their bottom ends, these slotted portions being fitted over the opposite ends of the cycle axle. Shock mounts are mounted within the tubular members. The shock mounts include a lower cylindrical bushing which is fixedly attached to the axle and a shock absorber mounted above the bushing with one end of the shock absorber being attached to an extension which is attached to the top end of the tubing. A spring is mounted between the lower bushing and the top end of the tubing, there being an adjustment screw above the spring for adjusting the tension thereof and thus the spring action of the mount.

3 Claims, 11 Drawing Figures

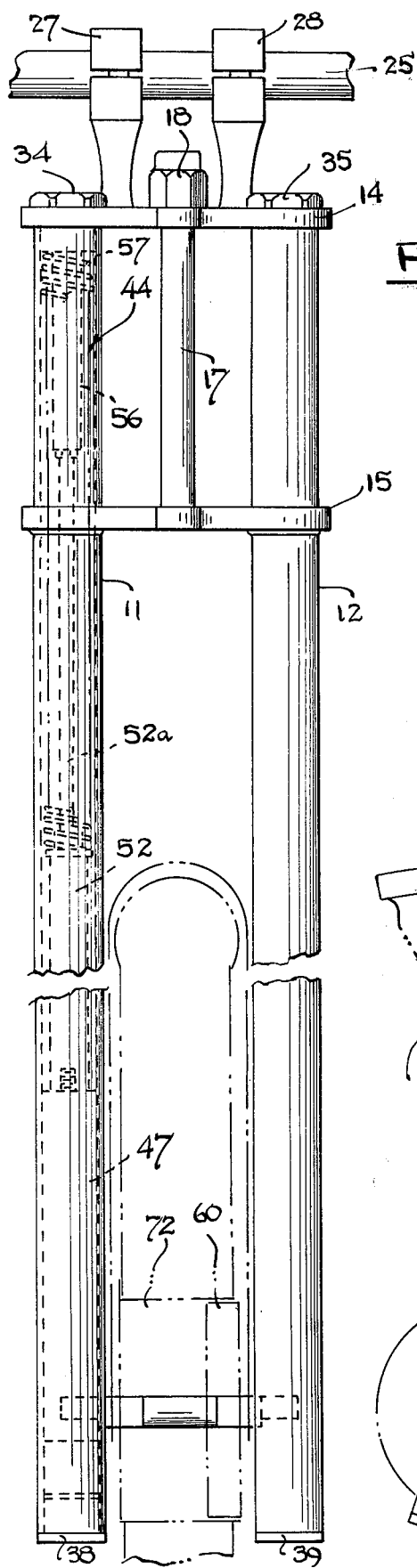
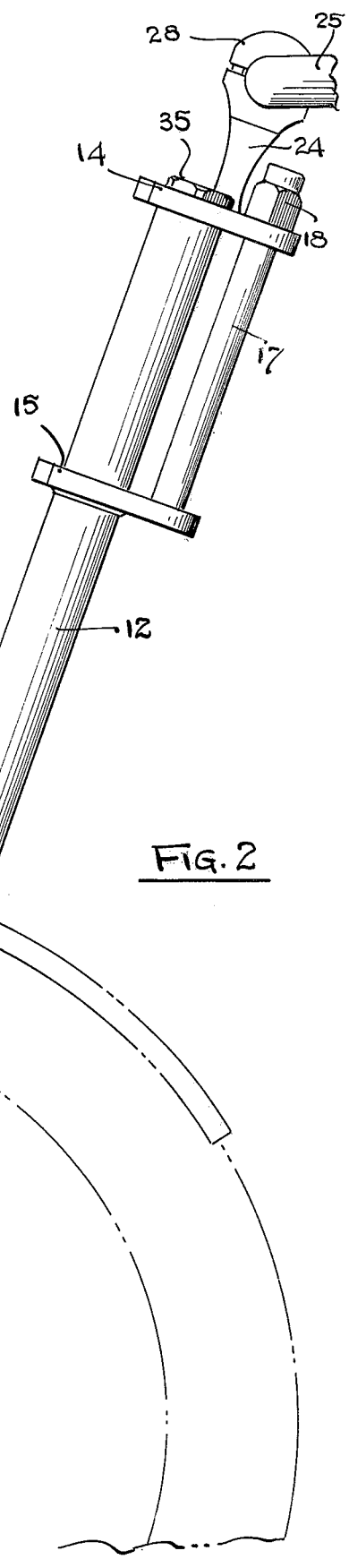
FIG. 1
FIG. 2

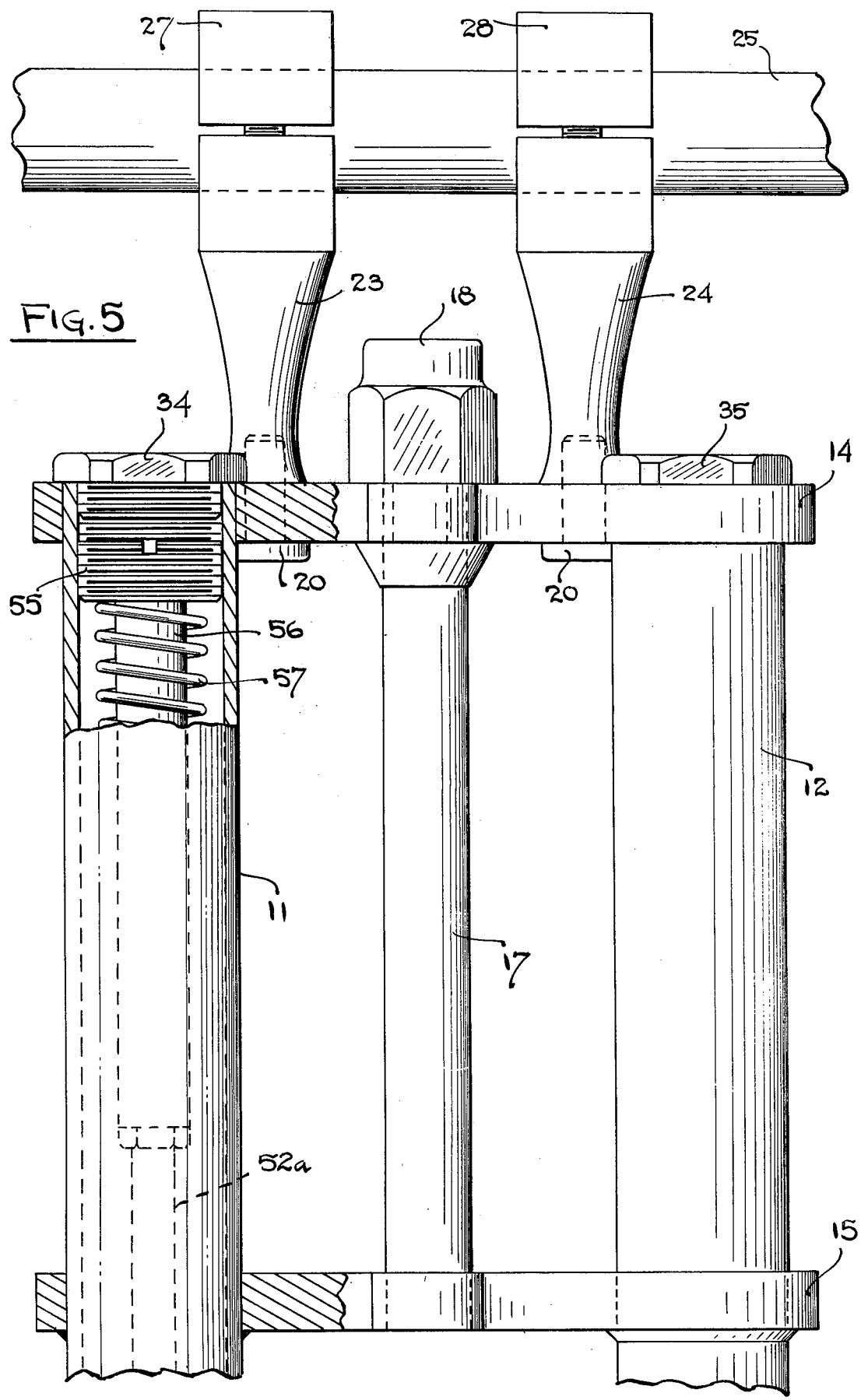

MOTORCYCLE FORK STRUCTURE

This invention relates to motorcycle front and fork structures, and more particularly to such a structure in which the steering column of the cycle is constrained against rotatable movement relative to the wheel axle.

In motorcycle front end forks, the shock mounts are generally mounted so that freedom of rotatable motion between the fork and the steering column is permitted relative to the wheel axle. Such freedom of rotational motion results in considerable wear on the shock absorber and shock mount bushings. This problem compounds itself with leakage of oil past the shock absorber bushings, this oil mixing with dirt which sticks around the fork bushings and contributes to even greater wear. This necessitates the frequent replacement of the bushings used in the fork structure, particularly in situations where the motorcycle is subjected to heavy use. Still further wear on the bushings causes a deterioration in front end control which poses a safety hazard. In addition, the rotatable freedom permitted between the steering column and the axle lowers the tightness of the steering control which is particularly disadvantageous in situations where the cycle is used on rough terrian, as in dirt bike riding, where tight steering control is particularly needed.

Typical motorcycle fork structures of the prior art, as described above, are found in U.S. Pat. Nos. 836,040 to Hornecker et al.; 2,475,774 to Benson; 2,768,836 to Hilber; 3,810,659 to Marcil; 3,989,261 to Kawaguchi; and 4,012,055 to Ottow.

The device of the present invention provides an improvement over such prior art fork structures in that while affording the necessary freedom of motion vertically between the steering column and the wheel axle to enable proper shock absorption and resilient mounting of the front wheel relative to the frame, nevertheless constrains against rotational movement of the axle, the wheel and other parts mounted thereon relative to the steering column.

This improved result is achieved in the device of the present invention by employing tubular members in the fork structure which members are fixedly attached at one end thereof to the steering column and which are connected to the wheel axle for limited freedom of motion longitudinally, yet constrained against rotatable motion relative to the axle. Mounted within each of the tubing members is a shock mount structure which includes a bushing which is fixedly attached to the axle and a shock absorber, one end of which is attached to the bushing. The other end of the shock absorber is fixedly attached to an extension member which is attached to the top end of the tubing member. A spring, the tensioning of which can be adjusted, is mounted over the shock absorber in conventional fashion to provide the necessary cushioning.

It is therefore an object of this invention to lessen the wear on the bushings of motorcycle fork structures.

It is a further object of this invention to provide tighter coupling between the steering column of a motorcycle and the wheel axle.

Other objects of the invention will become apparent as the description proceeds in connection with the accompanying drawings of which:

FIG. 1 is a front elevational view of a preferred embodiment of my invention;

FIG. 2 is a side elevational view of the embodiment of FIG. 1;

FIG. 5 is a front elevational view illustrating the details of the upper portions of the preferred embodiment;

Figure 6:
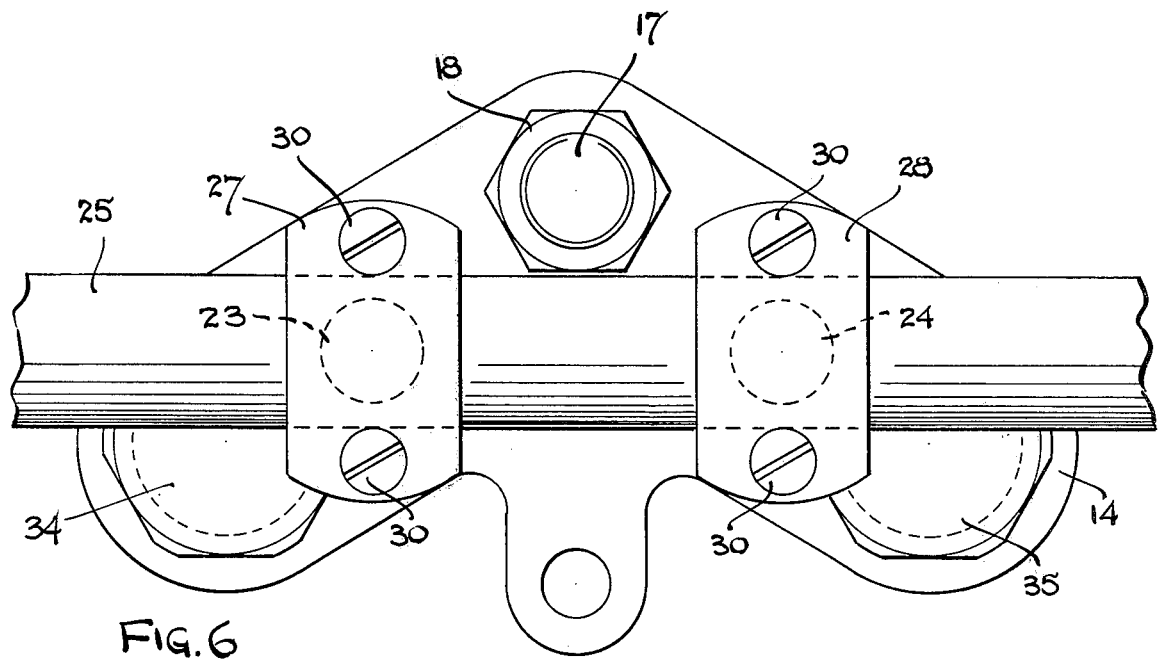
FIG. 6 is a top plan view of the preferred embodiment.
Figure 7:
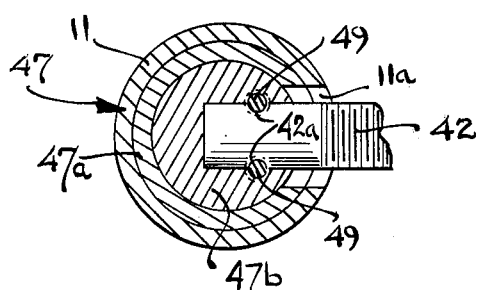
FIG. 7 is a cross-sectional view taken along the plane indicated by 7—7 in FIG. 3.
Figure 8:
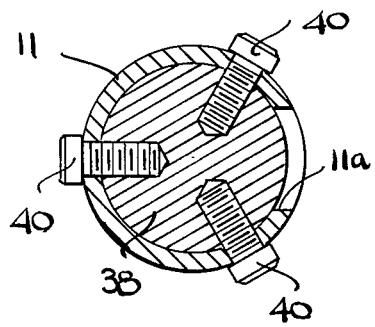
FIG. 8 is a cross-sectional view taken along the plane indicated by 8—8 in FIG. 3.
Figure 4:
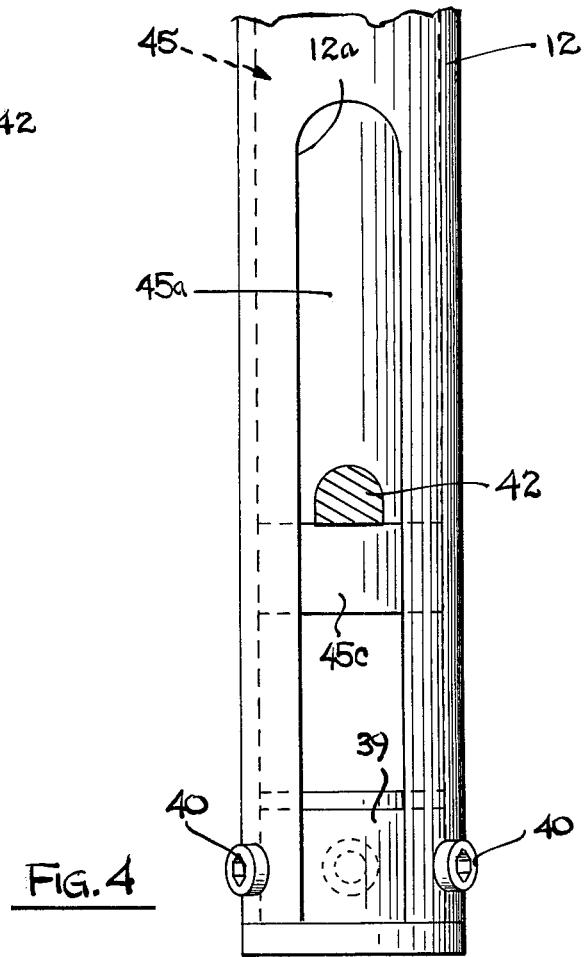
FIG. 4 is a view taken along the plane indicated by 4—4 in FIG. 3.

Referring now to the figures, a preferred embodiment of the invention is illustrated. Tubular members 11 and 12 are joined together to form a forked configuration by means of plates 14 and 15 which are attached to the tube members, plate 15 being retained on the tube members and plate 14 being fastened thereto by means of threaded caps 34 and 35. A center post member 17 extends between plates 14 and 15 to provide reinforcement to the structure, post 17 being fitted in plate 15 and attached to plate 14 by means of nut member 18. As best can be seen in FIG. 5, attached to plate 14 by means of bolts 20 are a pair of support posts 23 and 24 which are used to support handlebar 25. Handlebar 25 is clamped to the posts 23 and 24 by means of bracket members 27 and 28 which are attached to the posts by means of bolts 30 (see FIG. 6).

Tubular members 11 and 12 are fitted through apertures formed in plates 14 and 15 and are retained to plate 15 by bolts (not shown) and to plate 14 by means of cap members 34 and 35 which threadably engage the inner walls of their associated tube members. The bottom ends of the members 11 and 12 are closed off by means of caps 38 and 39, respectively, which are bolted to the tube members by means of machine screws 40. The inner bottom side portions of tube members 11 and 12 have elongated slots 11a and 12a formed therein, the opposite ends of the front wheel axle 42 being fitted through these slots.

Figure 3:
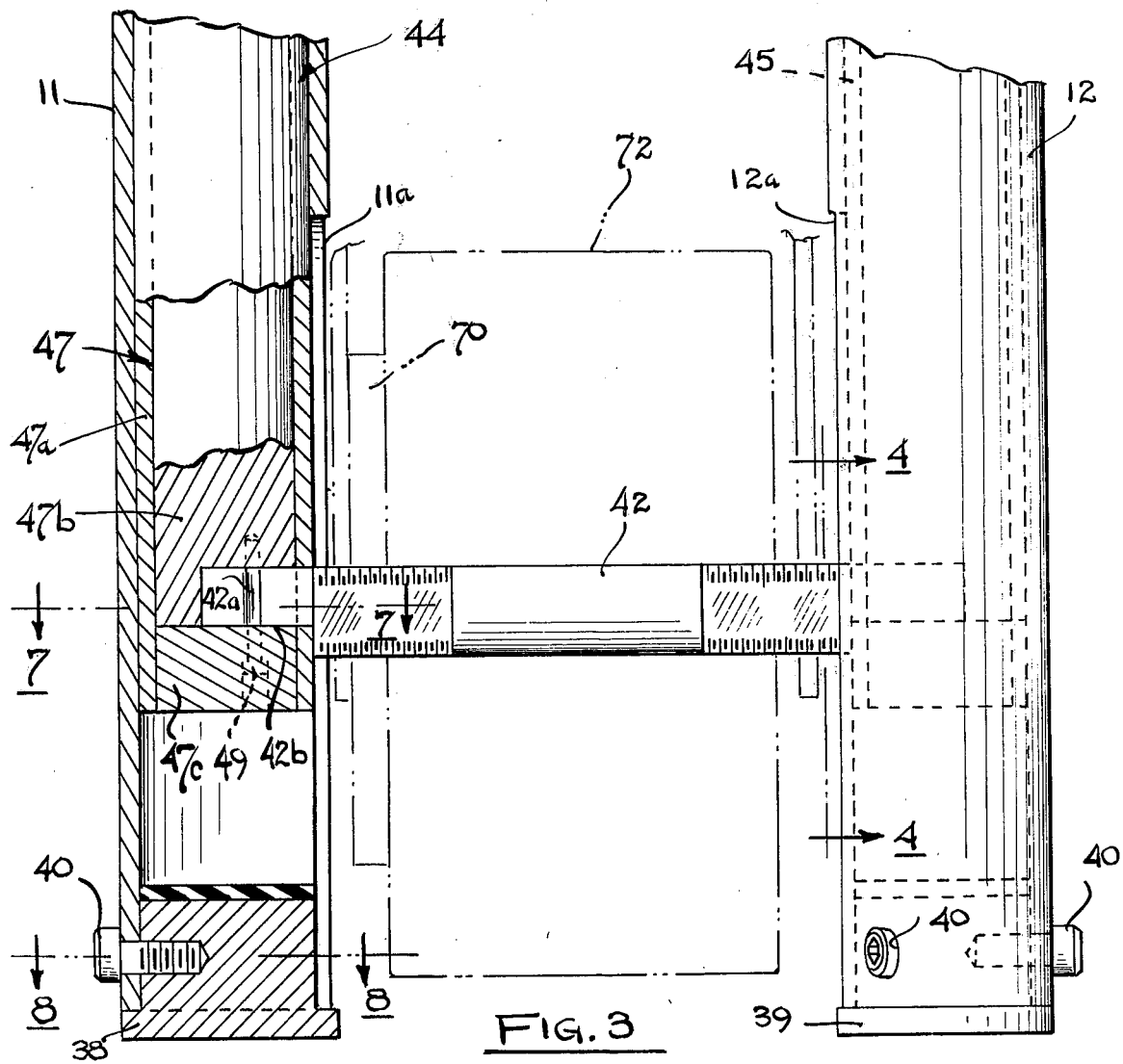
FIG. 3 is a front elevational view, partly in cross section, which illustrates the details of the lower portion of the preferred embodiment.

Mounted slidably within tubing members 11 and 12 are shock mount assemblies 44 and 45, respectively. Each of the shock mount assemblies, as best can be seen in FIGS. 3 and 5, includes a bushing member 47 formed by an outer tubular member 47a and an inner cylindrical member 47b which is fixedly attached to the end of axle 42 by means of bolts 49 which fit in grooves 42a formed in the axle. The bottom wall portions 42b of the ends of the axle are undercut and flattened so that they rest on plug members 47c which are at the ends of the bushings. A shock absorber 52 is mounted in each of tubing members 11 and 12 above bushing 47, as best can be seen in FIG. 1, the body of the shock absorber being threadably attached to the top end of bushing 47. The end of the piston rod 52a of the shock absorber is attached to an extension member 56 which threadably engages the inner wall of the tube member by virtue of its attachment to adjustment screw 55. A coil spring 57 is mounted over the piston rod of the shock absorber and extends between adjustment screw 55 and the top end of the shock absorber cylinder, as can best be seen in FIG. 1. The tensioning of spring 57 can be adjusted by means of threaded adjustment plug 55 to provide the desired tension. It is to be noted that the placement of the shock absorbers near the top end of the tubing enables their ready removal and replacement merely by removing caps 34 and 35 and adjustment screws 55.

Figure 9:
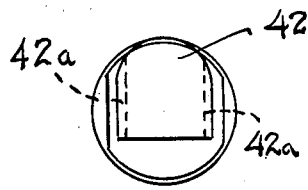
FIG. 9 is an enlarged end view illustrating the axle of the preferred embodiment.
Figure 10:
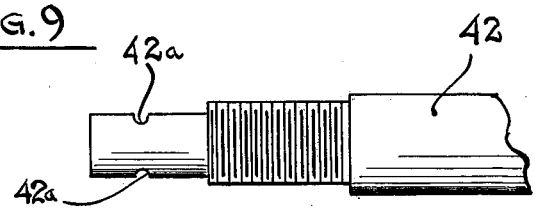
FIG. 10 is a top plan view illustrating the axle of the preferred embodiment.
Figure 11:
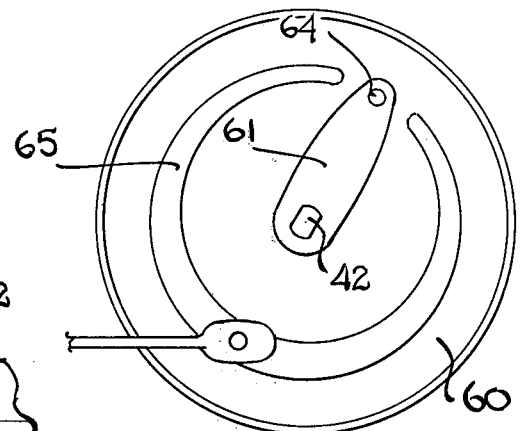
FIG. 11 is a side elevational view showing the brake mounting structure of the preferred embodiment.

As best can be seen in FIG. 11, the threaded portions of the axle have flattened sides to permit the mounting of the brake shoe plates 60 thereon by means of an anchor 61. The brake shoe plate is fixedly attached to the anchor by means of bolt 64 and the brake shoes 65 being attached to the brake shoe plate in conventional fashion. Brake rotors 70 are fixedly mounted on wheel hub 72, again in conventional fashion.

As can be seen, in operation, longitudinal freedom of motion between the frame of the motorcycle and the wheel axle is permitted on shock mount assembly 44, with tubing members 11 and 12 being free to move vertically relative to the axle which is mounted in slots 11a and 12a. At the same time, rotatable motion of the tubing members 11 and 12 relative to axle 42 is constrained by the side walls of the slots. It is also to be noted that the axle is constrained against rotation on its axis by virtue of its flattened surface 42b which abuts against bushing plug members 47c.

While the invention has been described and illustrated in detail, it is clearly to be understoo that this is intended by way of illustration and example only and is not to be taken by way of limitation, the spirit and scope of this invention being limited only by the terms of the following claims.

I claim:

1. In a fork structure for the front end of a motorcycle, the improvement whereby the steering column structure of the motorcycle is connected to the motorcycle front wheel axle for limited longitudinal movement but constrained against any significant rotatable motion relative to the axle comprising a pair of tubular members, means for joining said tubular members together near the top ends thereof to form a fork, the bottom end portions of said tubular members having elongated slots formed therein, the opposite end portions of the axle being fitted in said slots for longitudinal movement therealong, shock mount structure means mounted within each of said tubular members for permitting resilient longitudinal relative movement between the steering column structure and the wheel axle while constraining relative rotatable movement between the steering column structure and the axle, said shock mount structure means comprising a bushing fixedly attached at one end thereof to said wheel axle and a shock absorber, one end of which is attached to the other end of said bushing, the other end of said shock absorber being attached to the top end of the associated tubular member.

2. The fork structure of claim 1 and further including a front wheel brake for said motorcycle fixedly mounted on said axle.

3. In a fork structure for the front end of a motorcycle, the improvement whereby the steering column structure of the motorcycle is connected to the motorcycle front wheel axle for limited longitudinal movement but constrained against any significant rotatable motion relative to the axle comprising a pair of tubular members, means for joining said tubular members together near the top ends thereof to form a fork, the bottom end portions of said tubular members having elongated slots formed therein, the opposite end portions of the axle being fitted in said slots for longitudinal movement therealong, a shock mount structure mounted within each of said tubular members, said shock mount structure comprising a bushing fixedly attached at one end thereof to said wheel axle and a shock absorber, one end of which is attached to the other end of said bushing, the other end of said shock absorber being attached to the top end of the associated tubular member, a threaded plug which threadably engages the top end of each of said tubular members, and a coiled spring mounted over a first portion of each of said shock absorbers, the other end of each of said springs abutting against a second portion of each of said shock absorbers such that the tensioning of each of said springs can be adjusted by threadably positioning the associated one of said adjustment plugs longitudinally of the associated one of said tubular members, whereby resilient longitudinal relative movement between the steering column structure and the wheel axle is permitted with relative rotatable movement between the steering column structure and the axle being substantially constrained.

* * * * *